United States Patent [19]

Boyer et al.

[11] Patent Number: 5,117,708
[45] Date of Patent: Jun. 2, 1992

[54] HANDLEBARS FOR MOTORCYCLES, DIRT BIKES, ALL TERRAIN VEHICLES AND JET SKIS

[75] Inventors: Scott M. Boyer, Valencia; Charles R. Teixeira, IV, Littlerock, both of Calif.

[73] Assignees: Answer Products, Inc., Valencia; Easton Aluminum, Inc., Van Nuys, both of Calif. ; a part interest

[21] Appl. No.: 656,694

[22] Filed: Feb. 19, 1991

[51] Int. Cl.$^5$ .............................................. B62K 21/12
[52] U.S. Cl. .................. 74/551.1; 74/551.4; 74/551.6
[58] Field of Search ............... 74/551.1, 551.4, 551.5, 74/551.6; D12/178

[56] References Cited

U.S. PATENT DOCUMENTS

| | | | |
|---|---|---|---|
| D. 30,821 | 5/1899 | Scandrett | D12/178 |
| D. 101,953 | 11/1936 | Henry | D12/178 |
| D. 301,027 | 5/1989 | Borromeo | D12/178 |
| 610,328 | 9/1898 | Martin | 74/551.1 |
| 822,487 | 6/1906 | Smith | 74/551.1 |
| 2,004,089 | 2/1934 | Anderson | 74/551.1 |
| 4,635,499 | 1/1987 | McMortrey | 74/551.1 |
| 4,903,542 | 2/1990 | Borromeo | 74/551.1 |

Primary Examiner—Leslie A. Braun
Assistant Examiner—Matthew Stavish
Attorney, Agent, or Firm—Thomas I. Rozsa

[57] ABSTRACT

Improved handlebars for power vehicles such as two wheeled vehicles and all terrain vehicles, and in particular to handlebars for off road motorcycles, dirt bikes, all terrain vehicles and jet skis. The improved design eliminates the requirement for a crossbar by designing handlebars that have a larger diameter central portion including the area where the handlebars are attached to the vehicle, and a unique tapered configuration wherein the handblebars are manufactured through a process that causes the same amount of metal to be located in the widest diameter portion of the handlebars as in the narrowest diameter portion of the handlebars. The handlebars have a longer unsupported span than conventional handlebars, thereby providing more cushioning strength and greater steering control.

14 Claims, 2 Drawing Sheets

HANDLEBARS FOR MOTORCYCLES, DIRT BIKES, ALL TERRAIN VEHICLES AND JET SKIS

BACKGROUND OF THE INVENTION

1. Field of the Invention

The present invention relates to the field of handlebars for power vehicles such as two wheeled vehicles and all terrain vehicles, and in particular to handlebars for off road motorcycles, dirt bikes, all terrain vehicles and jet skis.

2. Description of the Prior Art

Conventional handlebars for off road motorcycles and dirt bikes traditionally comprise a bent bar with a handle at each end. A front plan view of common prior art handlebars for motorcycles is illustrated in FIG. 1. The common prior art handlebars 100 comprise a bent bar 110, having a central section 120 and oppositely disposed end sections 130 and 140 which are mirror images of one another. The diameter "d" of the tubing for the bent bar 110 is traditionally of uniform diameter for the entire length of the bar. In general, the preferred diameter is $\frac{7}{8}$ inch because this provides the end sections 130 and 140 with the proper amount of thickness so that a handle member preferably made of polyvinyl or rubber and having a thickness of approximately $\frac{1}{8}$ to $\frac{1}{4}$ inch can be fitted over a portion of each end section.

While the thickness of approximately $\frac{7}{8}$ inch for the diameter provides an ideal thickness to facilitate the gripping member or handle at either end, it provides the middle section 120 and bent sections 132 and 142 with a thin member for absorbing the stresses, strains and shocks imparted to the handlebars 100 from off road or dirt bike riding. In order to strengthen the handlebars, the prior art design includes a crossbar 150 which is attached to the handlebars 100 at the locations of the intersection of the end section 130 with bent section 132 and the intersection of the end section 140 with bent section 142. There are two conventional methods by which the crossbar 150 is attached. In one method, the crossbar 150 is welded in place. In the second method, the crossbar 150 is clamped in place with a pair of clamps that are tightened with bolts.

In operation, the handlebars 100 are attached to the motorcycle, dirt bike, all terrain vehicle or jet ski along the length of the middle section 120 and usually at two spaced apart locations, and such that the crossbar 150 is facing the rider on the off road motorcycle, dirt bike or other vehicle. The $\frac{7}{8}$ inch middle section is usually not of sufficient strength to withstand the impact of heavy loads, and the purpose of the crossbar 150 is to prevent the handlebars 100 from buckling if the off road motorcycle or dirt bike should bump into something or crash to the ground. In fact, what happens is that the crossbar 150 and attachment to the bent tube 110 causes a permanent compression set to occur in the bent tubing 110 in the event of an impact. In addition, the crossbar 150 provides no added benefit when steering the off road motorcycle or dirt bike, and therefore the crossbar 150 in fact reinforces the handlebars 100 in only the verticle direction but not in the horizontal direction.

Therefore, the major disadvantage of prior art handlebars is that they require a crossbar for strength. However because the crossbar provides rigid support at its attachment points to the bent tube, it forces stress concentrations there, which tends to take a permanent set in falls. The crossbar also constrains any movement that would soften shock loads to the grips which are placed over the ends of the handlebars.

There is a significant need for an improved configuration for handlebars which provides greater strength, improved shock absorption, and improved steering capability.

SUMMARY OF THE PRESENT INVENTION

The present invention is improved handlebars for two wheeled vehicles, primarily for off road motorcycles and dirt bikes, and also for all terrain vehicles and jet skis. The improved design eliminates the requirement for a crossbar by designing handlebars that have a larger diameter central portion including the area where the handlebars are attached to the vehicle, and a unique tapered configuration wherein the metal of the handlebars is manufactured through a process that causes the same amount of metal to be located in the widest diameter portion of the handlebars as in the narrowest diameter portion of the handlebars. Alternatively, the handlebars can be manufactured such that the amount of material at each cross sectional location along the length of the handlebars is different, with more material being present at the largest diameter locations. The handlebars have end sections from the attachment points to the grips wherein the unsupported span is longer than conventional handlebars, thereby providing more cushioning strength and greater steering control.

It has been discovered, according to the present invention, that the maximum amount of stress on the handlebars is at the point of attachment of the handlebars to the vehicle such as an off road motorcycle or dirt bike. The stresses are maximized at the maximum leverage point which is at the location of the attachment of the handlebars to the vehicle. Substantial stresses also occur at the points of attachment of the crossbar to the bent tube of the handlebars. It has therefore been discovered that if the crossbar is eliminated, then a significant cause of stress at its attachment points is also eliminated.

It has further been discovered, according to the present invention, that if two cylindrical objects have the same amount of material in them but one has a larger diameter, then the strength of the cylinder with the large diameter is substantially greater because strength is proportional to the cube of the diameter. Therefore it has been discovered, according to the present invention, that if the diameter of the handlebars is substantially increased, then the strength of the handlebars is substantially increased, the handlebars can better withstand stresses, and the need for a crossbar to add strength is eliminated. It has additionally been discovered that if the diameter is substantially increased at the location where the handlebars are attached to the vehicle, then the strength of the handlebars at that location is substantially increased, the handlebars can better withstand stresses at that location, and the need for a crossbar is eliminated. It has additionally been discovered that if the clamping surface at the attachment location is increased by 29% over prior art clamping surface area, then the result is a 48% more positive clamping bite.

It has also been discovered, according to the present invention, that the longer the end section length is, the more cushioning the rider receives and the less impact to the rider's hands when a force is impacted on the motorcycle. Therefore, handlebars with bigger diameters and longer end sections between the attachment points to the vehicle and grips provide more steering control and greater cushioning of the impact from bumps and other forces generated as the vehicle goes over dirt roads and other off road obstacles.

It has additionally been discovered, according to the present invention, that if the end sections of the handlebars are tapered by an appropriate amount while at the same time having the same amount of material at each diameter location along the length of the handlebars, the configuration causes the end sections of the handlebars to bend like a flagpole or aircraft wing assembly and distribute the stress and load evenly along the length of the handlebars between the attachment locations and the grips.

It is therefore an object of the present invention to provide an improved design for handlebars which provides increased strength at the locations where the handlebars are attached to the vehicle and eliminates the necessity of a crossbar.

It is a further object of the present invention to provide an improved design for handlebars which evenly distributes the impact load along the length of the handlebars between the attachment points and the grip members on the ends of the handlebars.

It is an additional object of the present invention to provide handlebars which enable the rider to have increased and effective steering control of the off road motorcycle or dirt bike.

It is also an object of the present invention to achieve a more uniform distribution of strain over the handlebars by eliminating the crossbar and adjusting both the diameter and wall thickness to match the structural needs at every point on the handlebars.

It is another object of the present invention to provide handlebars which have higher impact absorption in falls because energy is distributed more evenly.

It is an additional object of the present invention to provide handlebars having reduced stiffness in the vertical direction, thereby more effectively dissipating shock loads from the vehicle.

It is a further object of the present invention to provide handlebars having increased stiffness in the horizontal direction, adding better steering control.

It is an other object of the present invention to provide shock attenuation through elimination of the crossbar or cross brace for handlebars. Shocks being transferred to the rider are significantly reduced, allowing more aggressive riding with more control and less rider fatigue.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 3:
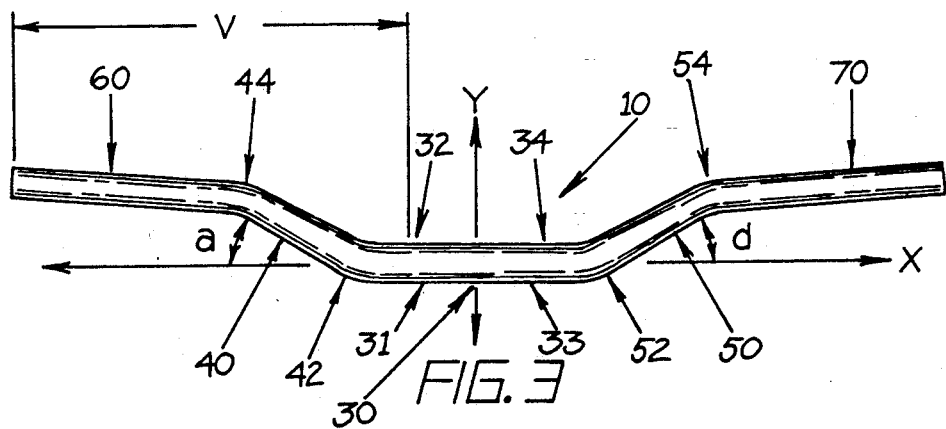
FIG. 3 is a front plan view of improved handlebars representing the preferred embodiment of the present invention.

Referring particularly to FIG. 3, there is illustrated at 10 a front plan view of the present invention improved handlebars for a vehicle such as an off road motorcycle, dirt bike or all terrain vehicle, or for other vehicles such as a jet ski. A critical feature of one embodiment of the present invention improved handlebars 10 is the creation of the bent tubing of the handlebars in a manner in which the amount of metal at each diameter location along the length of the tubing is the same, regardless of the actual diameter of the handlebar. In alternative embodiments, there are different amounts of metal at different diameters along the length of the handlebars, with the amount of metal being greatest at the locations of greatest stress. The improved handlebars 10 comprises a bent bar having a central section 30, a pair of oppositely disposed bent sections 40 and 50, and a pair of oppositely disposed end sections 60 and 70. Central section 30 extends to first bent section 40 which in turn extends to first end section 60. Similarly, at its other end, central section 30 extends to bent section 50 which in turn extends to end section 70. Bent sections 40 and 50 are mirror images of each other, and end sections 60 and 70 are mirror images of each other.

One key element of the present invention is that the diameter of the central section 30 where the handlebars are attached to the vehicle has been made much larger than conventional handlebars. Generally, the tubing from which prior art handlebars are made is the same diameter throughout. The preferred diameter for conventional tubing for handlebars is approximately ⅞ inch. As previously discussed, tubing of ⅞ inch diameter provides the preferred thickness for overlapping gripping means of approximately ¼ inch thickness since the resultant 1⅛ inch thickness is best suited for gripping by the human hand. However, the present invention has increased the diameter of the central section 30 of handlebars 10 to approximately 1⅛ inch. The strength of a cross-sectional area is increased by increased diameter and surface area. The strength of a cylindrical surface area is directly proportional to the cube of the cross-sectional diameter of the area. Therefore, increasing the diameter from approximately ⅞ inch to approximately 1⅛ inch provides a 29% increase in the diameter which very substantially increases the strength of the tubing of the central section 30. The central section 30 of handlebars 10 is clamped to a vehicle at locations 32 and 34. The clamping areas at attachment locations 32 and 34 are increased by approximately 48% over the clamping areas of prior art handlebars having only ⅞ inch diameter. As a result, the clamping bite of attachment clamps from the vehicle is very substantially increased over the clamping bite on prior art handlebars. Due to the significant increase in strength of the central section 30 over the prior art handlebars, the crossbar required for increasing the strength of prior art handlebars is not required and can be entirely eliminated for the present invention handlebars. As an additional result, the stress problems at the crossbar-tubing intersections as previously described are also entirely eliminated.

One of the critical features of the present invention is to produce the improved handlebars 10 from a single length of tubing which is manufactured by a specialized process that enables a portion of the tubing to have an enlarged diameter while the remainder of the tubing is gradually tapered to the smallest diameter located at the end sections 60 and 70. As previously described, the preferred diameter of the end sections 60 and 70 is approximately ⅞ inch. Therefore the tubing of handlebar 10 is manufactured so that the central section 30 has the largest diameter of approximately 1⅛ inch while the bent sections 40 and 50 are tapered so that the end sections 60 and 70 have the smallest diameter of approximately ⅞ inch.

The result of the improved design is that the improved handlebars have substantially increased horizontal stiffness due to its larger diameter at the central section. The elimination of the crossbar gives the improved handlebars 10 reduced vertical stiffness. The overall tapering design from the larger diameter of 1⅛ inch to the normal diameter of ⅞ inch enables the improved handlebars to absorb more impact energy and thus transmit less shock to the rider's hands than prior art designs. In addition, the crossbar of prior art designs transmits shock and vibration between the two opposite sides of a handlebar. The elimination of the crossbar permits each side to function independently.

Figure 1:
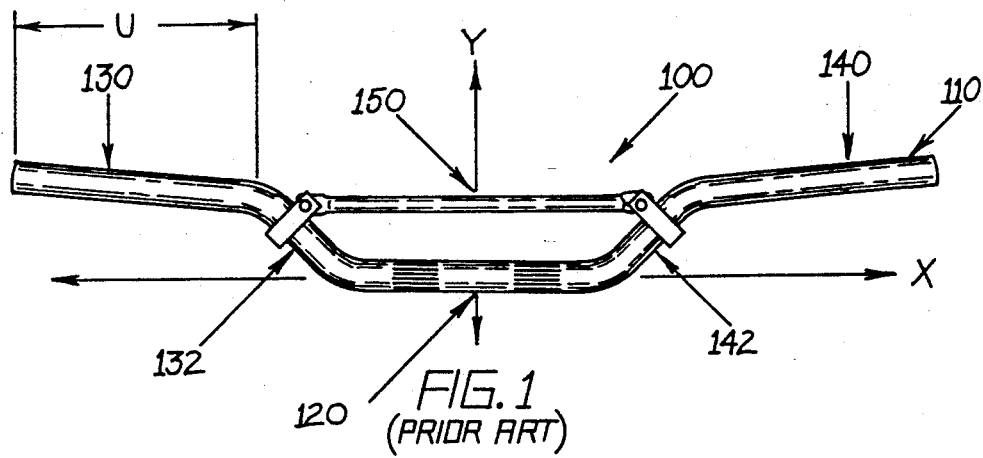
FIG. 1 is a front plan view of handlebars representing the most common prior art handlebars.
Figure 2:
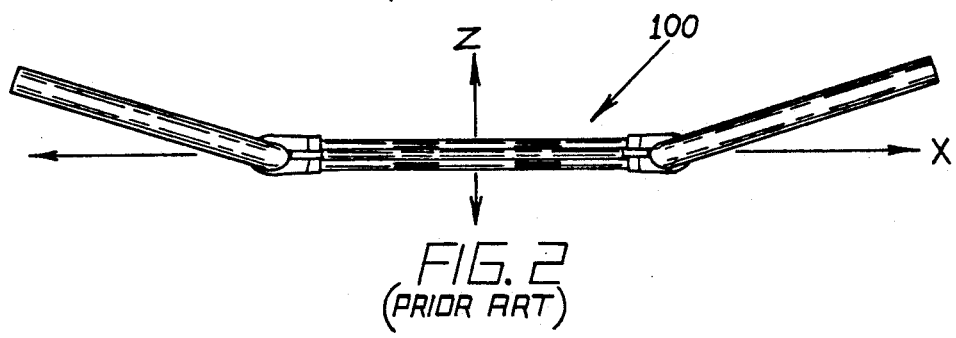
FIG. 2 is a top plan view of the prior art handlebars shown in FIG. 1.

Tapering of the handlebars allows for greater unsupported strength through the use of a large diameter at the points of high stress which is the location where the handlebars are attached to the vehicle. By tapering the handlebars, the length of unsupported span is significantly increased. The unsupported span of prior art handlebars is illustrated by dimension "U" in FIG. 1. The unsupported span of present invention handlebars is illustrated by dimension "V" in FIG. 3. The improvement is a greater area of span to distribute load, strain and impact more evenly, and substantially reduces the shock to the rider. It further provides added torsional control and positive steering feel to the rider. The tapering of bent sections 40 and 50 further causes them to bend comparable to a flag pole or aircraft wing assembly, thereby distributing the load more evenly and substantially reducing shock to the rider.

Figure 4:
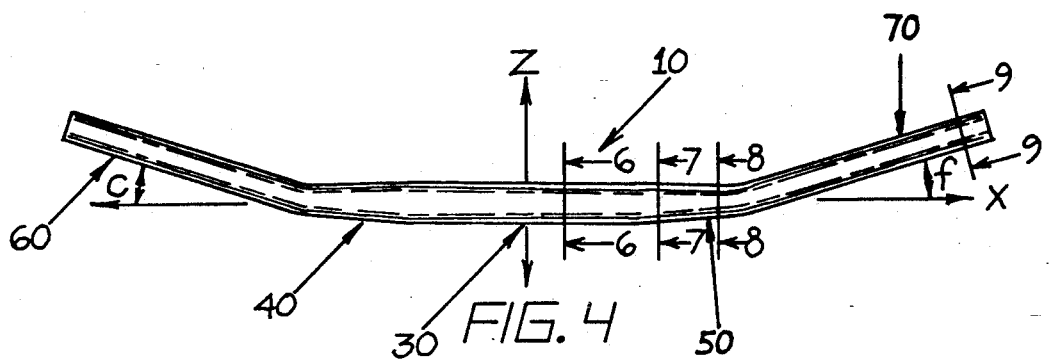
FIG. 4 is a top plan view of the improved handlebars of the present invention shown in FIG. 3.
Figure 5:
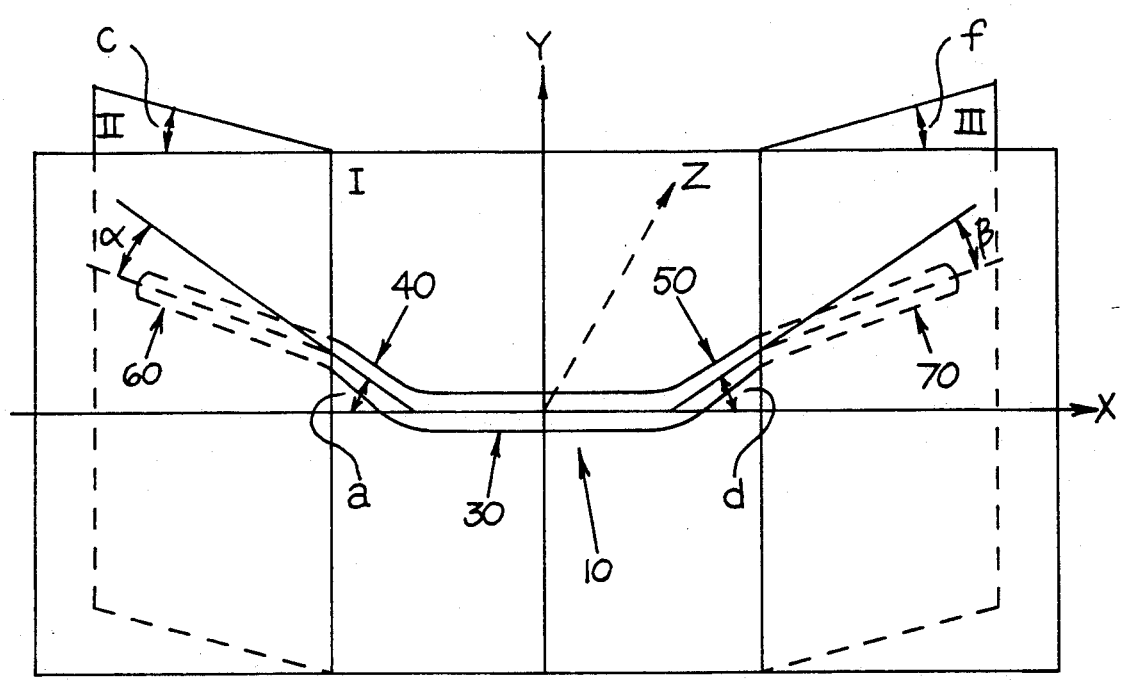
FIG. 5 is a perspective view of the improved handlebars of the present invention.
Figure 6:
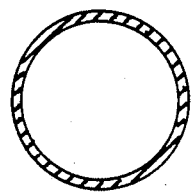
FIG. 6 is a cross-sectional view taken along line 6—6 of FIG. 4, showing the thickness of the generally cylindrical sidewall of the central section of the present invention handlebars.
Figure 7:
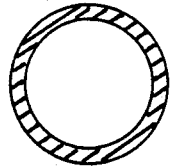
FIG. 7 is a cross-sectional view taken along line 7—7 of FIG. 4, showing the thickness of the generally cylindrical sidewall of a bent section of the present invention handlebars at a location adjacent to the central section of the present invention handlebars.
Figure 8:
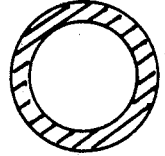
FIG. 8 is a cross-sectional view taken along line 8—8 of FIG. 4, showing the thickness of the generally cylindrical sidewall of the bent section of the present invention handlebars at a location adjacent to an end section of the present invention handlebars.
Figure 9:
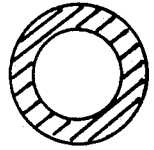
FIG. 9 is a cross-sectional view taken along line 9—9 of FIG. 4, showing the thickness of the generally cylindrical sidewall of the end section of the present invention handlebars.

As illustrated in FIGS. 3–5, in addition to the tapered configuration, improved handlebars 10 are also bent three dimensionally for the maximum benefit. FIG. 5 is the three dimensional perspective view of handlebar 10. FIG. 3 is the front plan view of viewing handlebars 10 from a position in front of FIG. 5 following a direction perpendicular to the X-Y plane, vertical plane I, and along the Z-axis. FIG. 4 is the top plan view of viewing handlebar 10 from a position on top of FIG. 5 following a direction perpendicular to the X-Z plane and opposite to the Y-axis. By way of example only, in a preferred embodiment of the present invention, the respective axes of central section 30 and first and second bent sections 40 and 50 are all in the same first vertical plane I, where the planar angle "a" between the axis of central section 30 and the axis of first bent section 40 may range approximately between 22 degrees to 70 degrees, and the planar angle "d" between the axis of central section 30 and second bent section 50 may also range approximately between 22 degrees and 70 degrees. First end section 60 is in a second vertical plane II, and the angle "c" between first vertical plane I and second vertical plane II may range approximately between 10 degrees and 25 degrees. The spherical angle "α" between the axis of first bent section 40 and the axis of first end section 60 may range approximately between 7 degrees and 80 degrees. Similarly, second end section 70 is in a third vertical plane III, and the angle "f" between first vertical plane I and third vertical plane III may also range approximately between 10 degrees and 25 degrees. The spherical angle "β" between the axis of second bent section 50 and the axis of second end section 70 may also range approximately between 7 degrees and 80 degrees. First and second bent sections 40 and 50 are mirror images of each other, and first and second end sections 60 and 70 are also mirror images of each other.

The preferred material for the improved handlebars is a high strength aluminum alloy. The improved handlebars can also be made out of aluminum, steel, titanium, or a composite of these metals.

As an optional feature, the surface of the center section 30 may have knurling 31 and 33 at the locations where the handlebars are attached to a vehicle.

Actual testing of improved handlebars 10 compared to prior art handlebars confirmed the previously discussed advantages of the present invention. To measure the amount of shock that reaches the rider's hands, each handlebar was clamped and a guided 8.6 pound weight was dropped from a height of 12 inches onto the end of the handlebar. A ¼ inch urethane pad was used to simulate the grip. An accelerometer was placed under the impact area recorded shock levels, which were read into a computer and stored. The data showed that two respective prior art handlebars registered similar shock loads of 289 G's and 272 G's respectively. Improved handlebars 10 registered only 213 G's or 22%–26% less.

Static deflection tests were also performed to measure the comparative stiffness of prior art handlebars and improved handlebars 10. Loads were applied through a hydraulic cylinder, and deflection was measured with a dial indicator. Due to the lack of the crossbar, improved handlebars 10 were 43% less stiff in the vertical direction than prior art handlebars with a crossbar. Improved handlebars 10 were also 33% stiffer in the horizontal direction due to the increase torsional stiffness of the larger diameter.

An impact test was run to determine the crash resistance of improved handlebars 10 compared to prior art handlebars. A guided 25 pound weight was dropped from a height of 4 feet onto the end of each handlebar in both the vertical and horizontal planes while clamped in standard motorcycle clamps. All handlebars were measured before and after drop testing and the amount of permanent set was documented. In the vertical direction, improved handlebars 10 exhibited only 34% of the total deformation present in the prior art handlebars. In the horizontal direction, improved handlebars 10 exhibited only 30% of the prior art handlebars' deformation.

Defined in detail, the present invention is handlebars comprising: (a) a center section having a first end and a second end; (b) a first bent section having a proximal end extending from the first end of said center section and a distal end, and a second bent section having a proximal end extending from the second end of said center section and a distal end; (c) a first end section extending from the distal end of said first bent section, and a second end section extending from the distal end of said second bent section; (d) the diameter of said center section being greatest, the diameters of said first and second end sections being smallest, and the diameters of said first and second bent sections being gradually tapered from greatest at their respective proximal ends to smallest at their respective distal ends; (e) said first bent section being a mirror image of said second bent section, and said first end section being a mirror image of said second end section; (f) all said sections being made of material configured as a hollow tube having a cylindrical sidewall, where the amount of material at each location along the handlebars is the same such that the thickness of the sidewall of said center section is thinnest, the thickness of the sidewall of said first and second end sections is thickest, and the thickness of the sidewall of said first and second bent sections is gradually increased from thinnest at their respective proximal ends to thickest at their respective distal ends; and (g) said center section and said first and second bent sections are in a same first vertical plane, said first end section is in a second vertical plane, and said second end section is in a third vertical plane.

In one of the preferred embodiments of the present invention defined in detail, (a) the planar angle between the axis of said first bent section and the axis of said center section is approximately between 22 degrees and 70 degrees, and the planar angle between the axis of said second bent section and the axis of said center section is approximately between 22 degrees and 70 degrees; (b) the angle between said first and second vertical planes is approximately between 10 degrees and 25 degrees, and the angle between said first and third vertical planes is approximately between 10 degrees and 25 degrees; (c) the spherical angle between the axis of said first bent section and the axis of said first end section is approximately between 7 degrees and 80 degrees, and the spherical angle between the axis of said second bent section and the axis of said second end section is approximately between 7 degrees and 80 degrees; (d) the greatest diameter is approximately between 1 inch and 1¼ inch, and the smallest diameter is approximately ⅞ inch; and (e) the handlebars further comprise knurling at two spaced apart locations on the exterior surface of said center section.

In an alternative embodiment of the present invention, the amount of material of the handlebars at locations along said center section is greater than the amount of material at locations along said first and second bent sections and said first and second end sections.

Defined broadly, the present invention is handlebars comprising: (a) a center section having a first end and a second end; (b) a first bent section having a proximal end extending from the first end of said center section and a distal end, and a second bent section having a proximal end extending from the second end of said center section and a distal end; (c) a first end section extending from the distal end of said first bent section, and a second end section extending from the distal end of said second bent section; (d) the diameter of said center section being greatest, the diameters of said first and second end sections being smallest, and the diameters of said first and second bent sections being gradually tapered from greatest at their respective proximal ends to smallest at their respective distal ends; and (e) said first bent section being a mirror image of said second bent section, and said first end section being a mirror image of said second end section.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. Handlebars comprising:
   a. a center section having a first end and a second end;
   b. a first bent section having a proximal end extending from the first end of said center section and a distal end, and a second bent section having a proximal end extending from the second end of said center section and a distal end;
   c. a first end section extending from the distal end of said first bent section, and a second end section extending from the distal end of said second bent section;
   d. The diameter of said center section being greatest, the diameters of said first and second end sections being smallest, and the diameters of said first and second bent sections being gradually tapered from greatest at their respective proximal ends to smallest a their respective distal ends;
   e. said first bent section being a mirror image of said second bent section, and said first end section being a mirror image of said second end section;
   f. all said sections being made of material configured as a hollow tube having a cylindrical sidewall, where the amount of material at each location along the handlebars is the same such that the thickness of the sidewall of said center section is thinnest, the thickness of the sidewall of said first and second end sections is thickest, and the thickness of the sidewall of said first and second bent sections is gradually increased from thinnest at their respective proximal ends to thickest at their respective distal ends; and g. said center section and said first and second bent sections are in a same first vertical plane, said first end section is in a second vertical plane, and said second end section is in a third vertical plane.

2. Handlebars in accordance with claim 1 wherein the planar angle between the axis of said first bent section and the axis of said center section is approximately between 22 degrees and 70 degrees, and the planar angle between the axis of said second bent section and the axis of said center section is approximately between 22 degrees and 70 degrees.

3. Handlebars in accordance with claim 1 wherein the angle between said first and second vertical planes is approximately between 10 degrees and 25 degrees, and the angle between said first and third vertical planes is approximately between 10 degrees and 25 degrees.

4. Handlebars in accordance with claim 3 wherein the spherical angle between the axis of said first bent section and the axis of said first end section is approximately between 7 degrees and 80 degrees, and the spherical angle between the axis of said second bent section and the axis of said second end section is approximately between 7 degrees and 80 degrees.

5. Handlebars in accordance with claim 1 wherein the greatest diameter is approximately between 1 inch and 1¼ inch, and the smallest diameter is approximately ⅝ inch.

6. Handlebars in accordance with claim 1 further comprising knurling at two spaced apart locations on the exterior surface of said center section.

7. Handlebars comprising:

a. a center section having a first end and a second end;

b. a first bent section having a proximal end extending from the first end of said center section and a distal end, and a second bent section having a proximal end extending from the second end of said center section and a distal end;

c. a first end section extending from the distal end of said first bent section, and a second end section extending from the distal end of said second bent section;

d. The diameter of said center section being greatest, the diameter of said first and second end sections being smallest, and the diameters of said first and second bent sections being gradually tapered from greatest at their respective proximal ends to smallest at their respective distal ends;

e. said first bent section being a mirror image of said second bent section, and said first end section being a mirror image of said second end section;

f. The handlebars being made of material configured as a hollow tube having a generally cylindrical sidewall; and g. The amount of material at each location along the handlebars is the same such that the thickness of the sidewall of said center section is thinnest, the thickness of the sidewall of said first and second end sections is thickest, and the thickness of the sidewall of said first and second bent sections is gradually increased from thinnest at their respective proximal ends to thickest at their respective distal ends.

8. Handlebars in accordance with claim 7 wherein said center section and said first and second bent sections are in a same first vertical plane.

9. Handlebars in accordance with claim 8 wherein the planar angle between the axis of said first bent section and the axis of said center section is approximately between 22 degrees and 70 degrees, and the planar angle between the axis of said second bent section and the axis of said center section is approximately between 22 degrees and 70 degrees.

10. Handlebars in accordance with claim 8 wherein said first end section is in a second vertical plane, and said second end section is in a third vertical plane.

11. Handlebars in accordance with claim 10 wherein the angle between said first and second vertical planes is approximately between 10 degrees and 25 degrees, and the angle between said first and third vertical planes is approximately between 10 degrees and 25 degrees.

12. Handlebars in accordance with claim 11 wherein the spherical angle between the axis of said first bent section and the axis of said first end section is approximately between 7 degrees and 80 degrees, and the spherical angle between the axis of said second bent section and the axis of said second end section is approximately between 7 degrees and 80 degrees.

13. Handlebars in accordance with claim 7 wherein the greatest diameter is approximately between 1 inch and 1¼ inch, and the smallest diameter is approximately ⅝ inch.

14. Handlebars in accordance with claim 7 further comprising knurling at two spaced apart locations on the exterior surface of said center section.

* * * * *